US009127807B1

(12) United States Patent
Holloway et al.

(10) Patent No.: US 9,127,807 B1
(45) Date of Patent: Sep. 8, 2015

(54) MODULAR ITEM HOLDER WITH V-SUPPORT AND FINGER ANCHOR BLOCK

(71) Applicants: Todd J. Holloway, Michigan City, IN (US); Stephen O. Slatter, Naples, FL (US)

(72) Inventors: Todd J. Holloway, Michigan City, IN (US); Stephen O. Slatter, Naples, FL (US)

(73) Assignee: Lighthouse Industries, Inc., Michigan City, IN (US)

( * ) Notice: Subject to any disclaimer, the term of this patent is extended or adjusted under 35 U.S.C. 154(b) by 0 days.

(21) Appl. No.: 13/930,991

(22) Filed: Jun. 28, 2013

Related U.S. Application Data

(63) Continuation-in-part of application No. 13/869,367, filed on Apr. 24, 2013.

(51) Int. Cl.
*E04G 3/00* (2006.01)
*F16M 13/02* (2006.01)

(52) U.S. Cl.
CPC .................................. *F16M 13/022* (2013.01)

(58) Field of Classification Search
USPC .............. 248/274.1, 301, 307, 303, 304, 305, 248/309.1, 310, 311.2, 313, 222.41, 223.21, 248/225.11, 220.21, 200, 205.1, 205.2, 689, 248/690, 694, 220.31
See application file for complete search history.

(56) References Cited

U.S. PATENT DOCUMENTS

| | | | | |
|---|---|---|---|---|
| 1,816,723 A * | 7/1931 | Dunoyer | ........................ | 269/131 |
| 4,005,844 A * | 2/1977 | Richmond | ................. | 248/311.3 |
| 4,304,383 A * | 12/1981 | Huston | ......................... | 248/313 |
| 4,391,376 A * | 7/1983 | Finnegan | ..................... | 211/70.5 |
| 4,852,840 A * | 8/1989 | Marks | ......................... | 248/230.4 |
| 4,997,157 A * | 3/1991 | Sweeny | ......................... | 248/313 |
| 5,070,636 A * | 12/1991 | Mueller | ........................... | 42/94 |
| 5,346,165 A * | 9/1994 | Frean et al. | .................... | 248/146 |
| 5,487,518 A * | 1/1996 | McCraney et al. | ...... | 248/225.11 |
| 5,573,211 A * | 11/1996 | Wu | ....................................... | 248/96 |
| 5,811,720 A * | 9/1998 | Quinnell et al. | ............. | 89/37.04 |
| 5,906,302 A * | 5/1999 | Spergel | ......................... | 224/250 |
| 6,047,930 A * | 4/2000 | Bello | ............................... | 248/61 |
| 6,095,386 A * | 8/2000 | Kuo | ................................ | 224/448 |
| 6,378,825 B1 * | 4/2002 | Yee et al. | ................. | 248/221.11 |
| 6,397,507 B1 * | 6/2002 | Marshall et al. | ................... | 42/72 |
| 6,588,637 B2 * | 7/2003 | Gates et al. | .................... | 224/546 |
| 6,789,649 B2 * | 9/2004 | Herrmann | ................... | 182/186.7 |
| 6,843,456 B1 * | 1/2005 | Hajianpour | ................. | 248/230.1 |
| 6,994,300 B2 * | 2/2006 | Labeirie et al. | .................. | 248/70 |
| 7,032,494 B2 * | 4/2006 | Wygant | ......................... | 89/37.04 |
| 7,090,174 B2 * | 8/2006 | Korczak et al. | ................. | 248/61 |
| 7,124,975 B2 * | 10/2006 | Richardson | .................... | 242/402 |
| 7,565,762 B2 * | 7/2009 | Lackey | .............................. | 42/94 |

(Continued)

*Primary Examiner* — Monica Millner
(74) *Attorney, Agent, or Firm* — Malin Haley DiMaggio & Bowen, P.A.

(57) ABSTRACT

A modular V-support holder including a rigid holder arm and strap, wherein the rigid holder arm and the strap are configured to releasably retain one or more items therein. The holder is attachable to a track mount and the track mount is slidingly received in a mounting track such that the clamp is moveable and adjustable with respect to the mounting track. The rigid holder arm includes a strap post configured to receive a distal end of the strap. The strap is flexible to conform to the one or more items retained in the holder. The track mount is a flexible finger anchor block constructed to be manually deformed and inserted in the track. The mounting protrusion is inserted into a receiving recess of the flexible finger anchor block and the holder is rotated substantially 90° to secure the mounting protrusion and holder into the flexible finger anchor block.

3 Claims, 15 Drawing Sheets

(56) References Cited

U.S. PATENT DOCUMENTS

| | | | |
|---|---|---|---|
| 7,694,925 B2* | 4/2010 | Kokenge et al. | 248/220.42 |
| 8,024,884 B2* | 9/2011 | Holmberg | 42/124 |
| 8,161,674 B2* | 4/2012 | Holmberg | 42/90 |
| 8,366,058 B2* | 2/2013 | Tiedemann, Sr. | 248/74.3 |
| 8,398,040 B2* | 3/2013 | Busch | 248/230.8 |
| 8,893,333 B2* | 11/2014 | Soto et al. | 5/640 |
| 2003/0168484 A1* | 9/2003 | Gates et al. | 224/401 |
| 2006/0208150 A1* | 9/2006 | Elmer et al. | 248/694 |
| 2007/0031142 A1* | 2/2007 | Moody et al. | 396/419 |
| 2007/0114348 A1* | 5/2007 | Nawrocki | 248/220.21 |
| 2009/0114784 A1* | 5/2009 | Tam | 248/205.1 |
| 2012/0056059 A1* | 3/2012 | Delamater et al. | 248/299.1 |

* cited by examiner

MODULAR ITEM HOLDER WITH V-SUPPORT AND FINGER ANCHOR BLOCK

CROSS REFERENCE TO RELATED APPLICATIONS

This application is a continuation-in-part of co-pending U.S. application Ser. No. 13/869,367 filed on Apr. 24, 2013, entitled "Modular Item Holder and Clamp".

STATEMENT REGARDING FEDERALLY SPONSORED RESEARCH OR DEVELOPMENT

N/A

BACKGROUND OF THE INVENTION

1. Field of the Invention

The present invention generally relates generally to a modular item holder and anchor block hardware and more particularly to a modular item holder with a V-support and finger anchor block for use on a marine vessel. However, the modular item holder can be utilized by numerous different tools and equipment outside of the marine environment including brooms, shovels and the like. For example, the device can be used in a home, garage, or commercial building environment.

2. Description of Related Art

Diving and fishing boats are often equipped with various compartments, clamps, clips, and related accessories for securing items to the vessel during operation of the vessel at sea. Particularly with respect to diving boats, there has been a trend to provide a plurality of clamps or holders to releasably contain diving gear, including dive tanks, regulators, vests, fins, and the like. Often overlooked is the need to releasably contain spear guns, which typically have a much smaller footprint and diameter than dive tanks and therefore will not fit in dive tank holders or clamps. Because there is a significant safety concern with respect to un-secured spear guns on board a moving vessel, there is a significant need in the art for an improved on-board item holder or clamp that is designed to retain spear guns and like-sized items.

It is, therefore, to the effective resolution of the aforementioned problems and shortcomings of the prior art that the present invention is directed. However, in view of the marine clamps and holders in existence at the time of the present invention, it was not obvious to those persons of ordinary skill in the pertinent art as to how the identified needs could be fulfilled in an advantageous manner.

SUMMARY OF THE INVENTION

A spear gun storage holder for a marine vessel comprising a mounting track that connects to a marine vessel, a spear gun body holding clamp device including a support clamp member and a pivoting clamp member, the support clamp member and the pivoting clamp member defining a clamp opening that releasably receives one or more items such as a spear gun body. A mounting support block extends from the rear of the support clamp member. A pressure spring is disposed between an outside wall of the pivoting clamp member and the support block to bias the clamp in a closed mode or position. The pivoting clamp member pivots to a closed position with respect to the support clamp member under spring tension and the spring pressure provides for closure of the clamp.

A pivot pin is attached through a proximal end of the pivoting clamp member, allowing the pivoting clamp member to pivot with respect to the support clamp member. The spring applies a force against the pivoting clamp member in order to releasably retain the spear gun body in the clamp. The inside walls of the support clamp member and the pivoting clamp member can receive rubber inserts to achieve a snug fit between the item being secured in the clamp and both of the clamp members. The rubber inserts can be removed to stow larger items if necessary.

The spear gun holding clamp is attachable to an anchor lock block and the anchor lock block is slidingly received in a mounting track attached to a marine vessel such that the device holding clamp is moveable and adjustable with respect to the mounting track.

A strap is connected at one end to the pivoting clamp member and can be connected and fastened to the support clamp as additional security to hold an item in the clamp.

In another embodiment, the present invention defines a V-support for holding a modular item such as a spear gun on a boat. The V-support item holder is comprised of a rigid support arm having a V shaped recess and a connectable strap, wherein the rigid support arm and the strap are configured to releasably retain and firmly hold one or more items therein. The holder is attachable to a track mount and the track mount is slidingly received in a mounting track such that the V-support item holder is moveable and adjustable with respect to the mounting track. The V-support holder arm includes a strap post configured to receive a distal end of the strap. The strap is flexible to conform to the one or more items retained in the V-support holder.

In some embodiments, the track mount is a flexible finger anchor block that can be manually deformed and inserted in or removed from the track. The flexible finger anchor block includes a receiving recess configured to receive a mounting protrusion on the V-support holder. The mounting protrusion is inserted into the receiving recess of the flexible finger anchor block and the V-support holder is rotated substantially 90° to secure the mounting protrusion and holder into the flexible finger anchor block.

Accordingly, it is an object of the present invention to provide a manually releasable V-support holder for a marine vessel that receives smaller items such as a spear gun for storage when the spear gun is not in use.

It is another object of the present invention to provide a spear gun V-support holder for a marine vessel that is slidingly received in a universal mounting track for enhanced storage stability of the spear gun or other item.

In accordance with these and other objects which will become apparent hereinafter, the instant invention will now be described with particular reference to the accompanying drawings.

BRIEF DESCRIPTION OF THE DRAWINGS

FIG. 7 is a rear perspective view of the embodiment shown in FIG. 6 of the V-support holder exploded from the track 40a.

FIG. 14 D is a front perspective view of the device shown in FIG. 14C.

DETAILED DESCRIPTION

Figure 1:
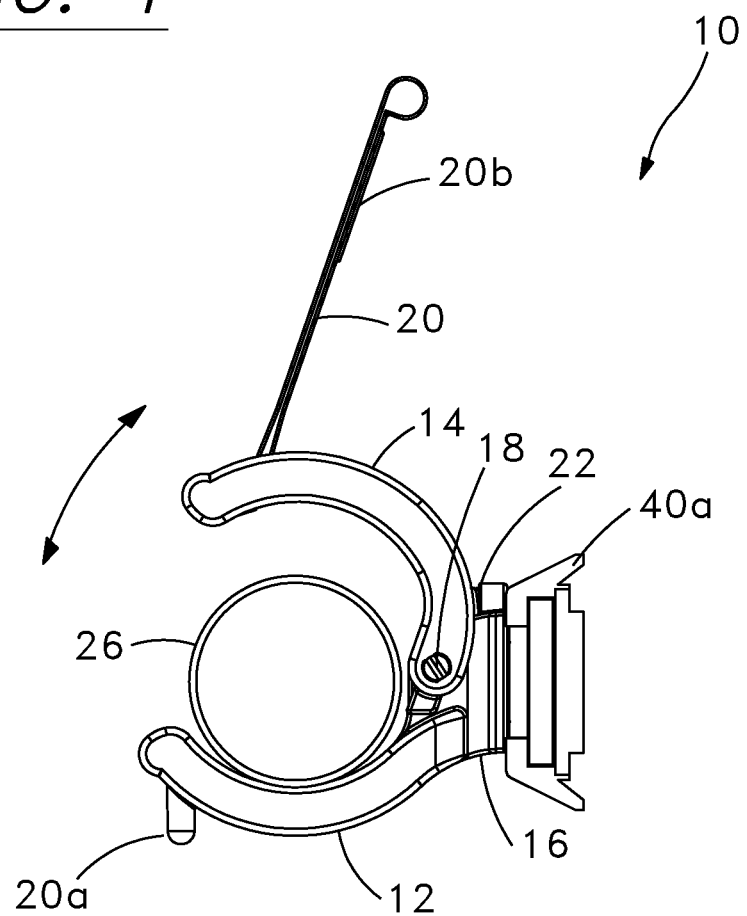
FIG. 1 is a top plan view of one embodiment of the device holding clamp of the present invention with the clamp open.

FIG. 1 is a top plan view of one embodiment of the spear gun marine vessel clamp 10 of the present invention. Shown is a device holding clamp 10 having a generally circular configuration comprising a fixed semi-circular arm acting as the support clamp member 12 and a pivoting movable semi-circular arm acting as a pivoting clamp member 14. The pivoting clamp arm 14 rotates with respect to the generally static support fixed arm 12. A clamp mounting block 16 extends from the rear of the fixed clamp arm 12. The support mounting block 16 retains a pivot pin 18 to which the pivoting clamp arm 14 is attached and rotates about. A compression spring 22 is mechanically disposed between the outside surface of the pivot clamp arm 14 and the support mounting block 16 which provides constant spring force to a closed clamp position for resilient closure of the clamp 10 as further described below. FIG. 1 also shows an item 26 (such as a spear gun or tubular shaped object) supported within the clamp 10, although pivot clamp arm 14 is shown in an open position. Further shown is an item security strap 20 with fastener 20b that engages strap post 20a. The strap 20 is attached at one end toward the distal end of the pivot clamp arm 14 and provides additional closure and security as further described.

Figure 2:
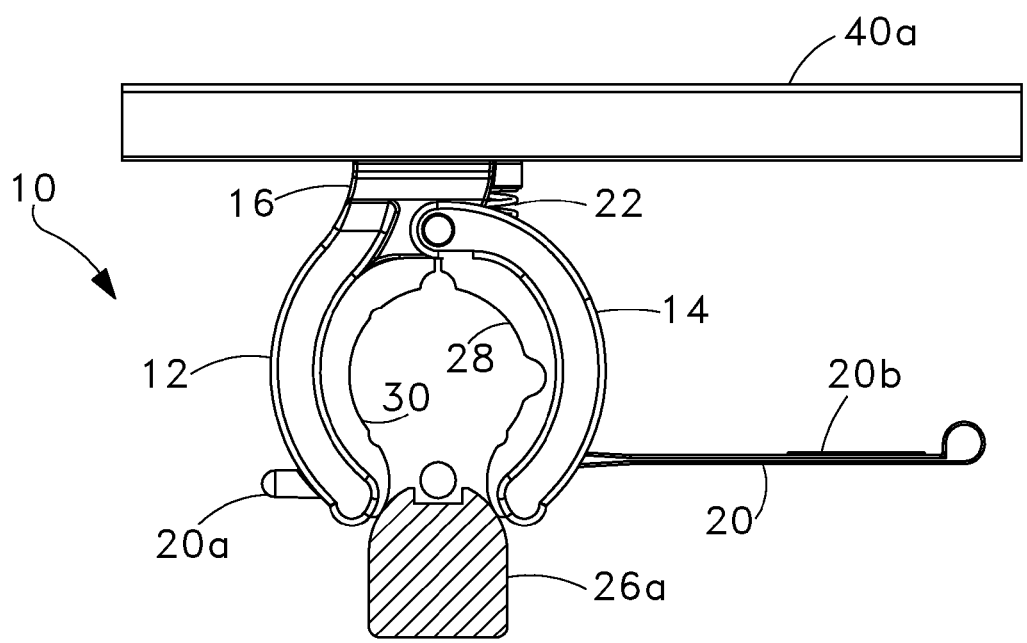
FIG. 2 is another top plan view of one embodiment of the clamp of the present invention with the clamp closed.

FIG. 2 depicts the clamp 10 of the present invention shown as receiving a spear gun 26a for securement. In some embodiments, the interior walls of the clamp fixed arm 12 and pivotal arm 14 include attached flexible pre-molded resilient inserts 30 and 28 respectively which provide a resilient barrier between the clamp fixed and pivotal arms 12 and 14 and spear gun 26a secured therein and further provide a tight fit, to reduce potential slippage, and to protect delicate spear gun surface finishes such as varnished wooden version 26a during insertion, storage and removal. The inserts 28 and 30 can be made of a suitable resilient material such as rubber. In some embodiments, the inserts 28 and 30 may include one or more pre-molded surface configuration forming positioning register reliefs which accommodate varying sized items, include spear guns, and will accommodate the peripheral configuration and the geometry of such items in order to provide a more secure fitment between the clamp 10 and the secured item. The insert 28 and 30 can be removed to slow larger sixed items as shown in FIG. 1. The pivoting clamp member can be manually opened to insert larger item that may not fit when clamp is closed.

Also shown in FIG. 2 is the spring 22 in its deployed position wherein the spring 22 exerts a force against the movable pivot clamp arm 14 such that the clamp movable arm 14 is brought toward the fixed arm 12 to a closed position. As the spear gun 26a or other item is inserted manually into the opening of the clamp 10, the movable pivot clamp arm 14 will deflect outwardly and press against the spring 22 which manual action opens the clamp 10 to receive the item. Once the item is fully received in the clamp, the force of the spring 22 causes the movable pivot clamp arm 14 to rebound toward the fixed clamp arm 12 closing the clamp opening and securing the item 26a within the clamp 10. The strap 20 is shown in its unsecured state. In some embodiments, the strap 20 is configured to wrap around the clamp opening and its distal end is secured to the strap post 20a, through strap fastener 20b, providing additional securement of the clamp 10 around its retained item. A mounting track that is attachable to a vessel bulkhead receives the mounting block 16 that allows the clamp to be moveably attached to a vessel in a track.

Figure 3:
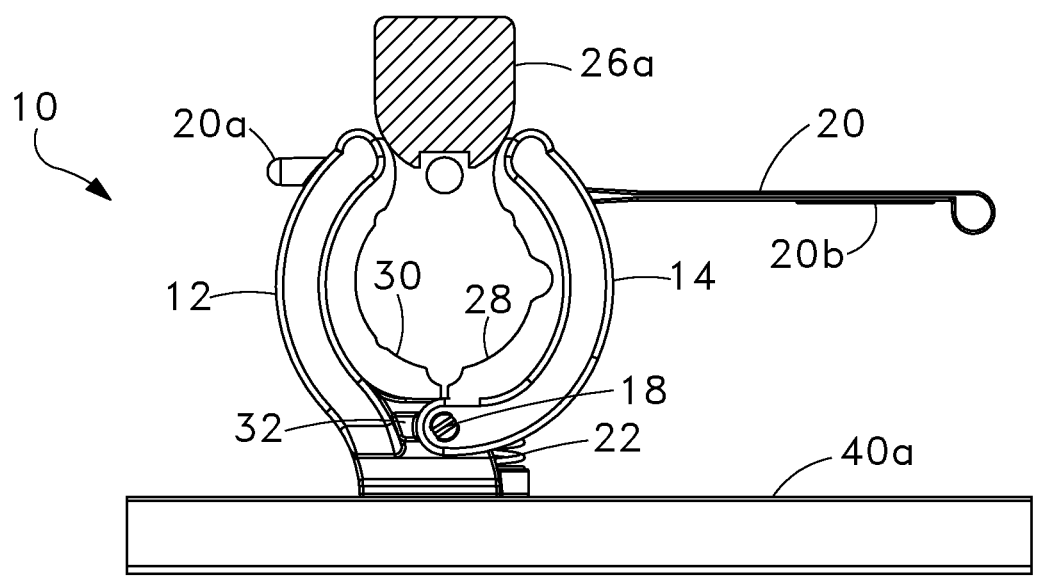
FIG. 3 is a bottom plan view of one embodiment of the clamp of the present invention with the clamp closed.

FIG. 3 depicts the bottom plan view of the clamp 10 of the present invention. Shown is an additional feature, the return stop leg 32, which is disposed on the proximal end of the pivot movable clamp arm 14. The return stop leg 32 limits the range of motion of the movable clamp arm 14 by being configured to press against the inside wall of the fixed clamp arm 12 as the movable clamp arm 14 pivots inward during closure of the clamp 10. This prevents excess tightening of the clamp 10 which would otherwise damage a spear gun 26 or other item held within the clamp. The return stop leg 32 also prevents excess deflection of the movable clamp arm 14 during operation of the vessel, particularly when the vessel is experiencing g-forces by moving erratically such as in high seas or the like. The return stop leg sets the correct opening gap between inserts 28 and 30 for the rectangular-shaped spear gun 26a to be pushed in under the spring force of spring 22 on arm 14. Once the spear gun 26a is captured, return stop leg 32 lifts away from arm 12.

Figure 4A:
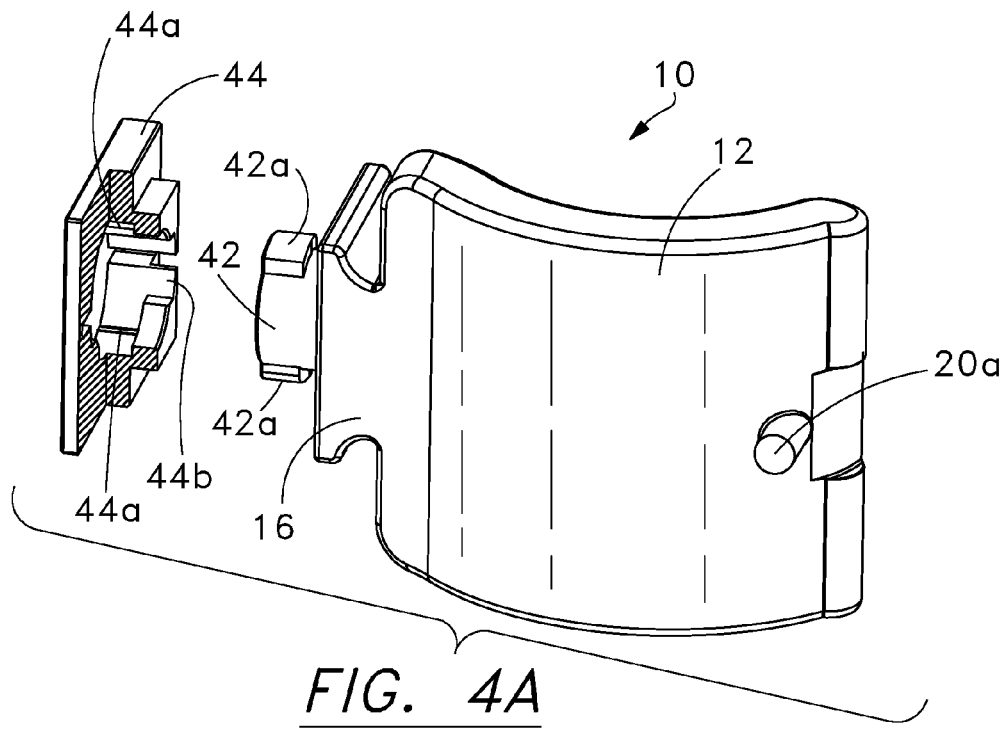
FIG. 4A is a side perspective view of the support fixed arm of the clamp partially exploded from the anchor lock and a side perspective view of the anchor lock block partially in cross section of the present invention.
Figure 4B:
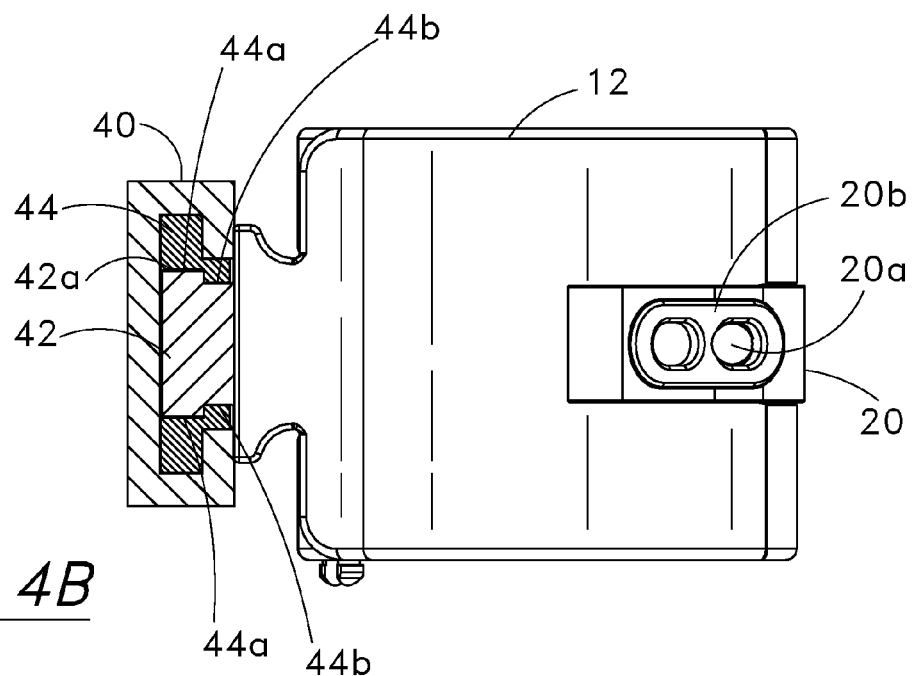
FIG. 4B is a side elevational view partially in cross section of the clamp shown in FIG. 4A with the strap in place.
Figure 5:
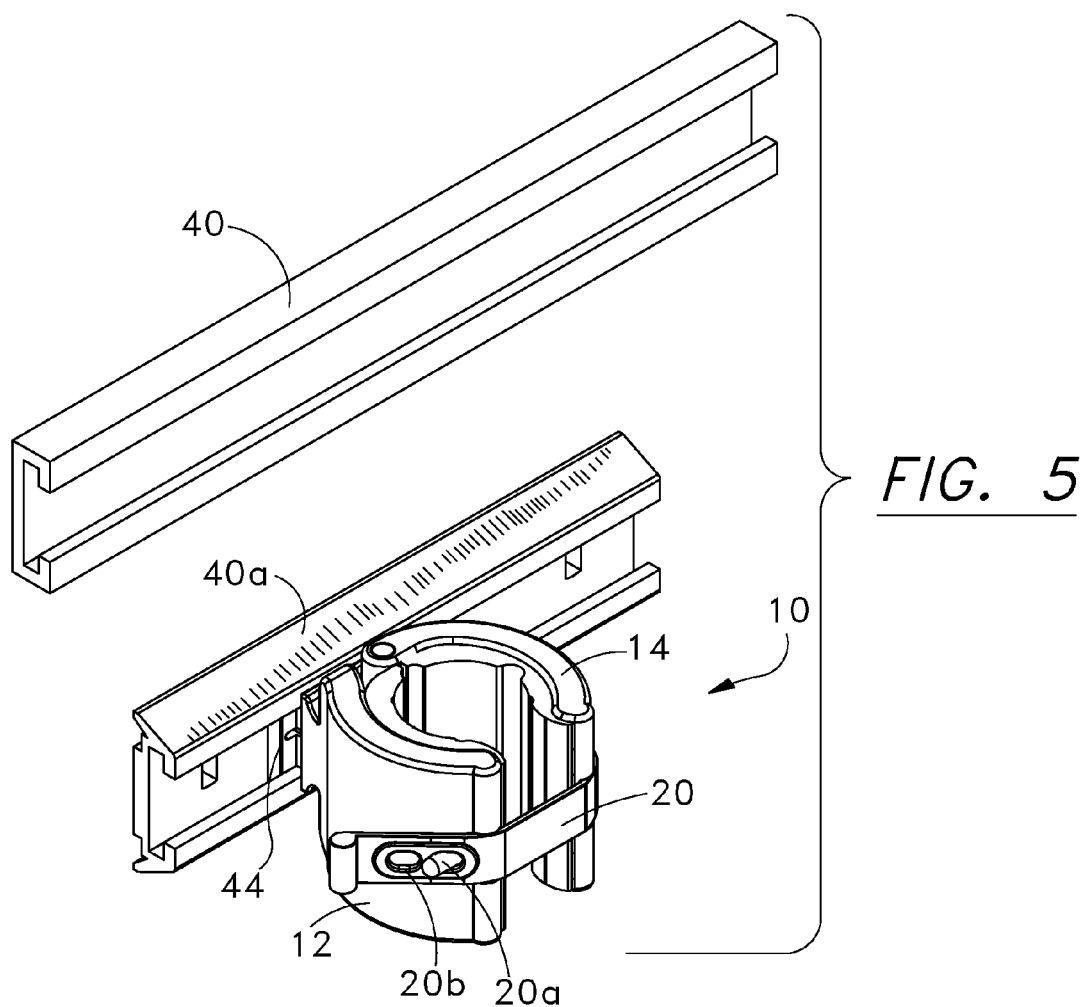
FIG. 5 is a perspective view of one embodiment of the clamp of the present invention with an additional mounting bar.

With reference to FIG. 4A, FIG. 4B, and FIG. 5, the clamp 10 of the present invention is configured to be received in a mounting track 40, which track 40 is installed along a bulkhead, gunwale or other support surface of a marine vessel. In some embodiments, extending rearward from the support block 16 are keyed protrusions 42 and 42a which are configured to engage an anchor lock block 44 which provides load bearing faces to retain the clamp 10. In some embodiments, the keyed protrusions 42 and 42a are configured to releasably engage the anchor lock block 44 to allow for quick connection and removal of the entire clamp 10 from a mounting track 40 as desired (FIG. 4B).

The anchor block 44 has a female opening 44b large enough across to receive clamp mounting protrusions 42a of a specific shape and an internal chamber for receiving the clamp mounting element 42 and upper and lower protrusions 42a. In order to attach the clamps 10 to the anchor block 44, the mounting element 42 and protrusions 42a are initially aligned with the female opening 44b of anchor lock block 44. The mounting element 42 and protrusions 42a are manually inserted into the female opening 44b in the anchor block 44 and rotated 90° into a locked position shown in FIG. 4B. The anchor block 44 has an internal cavity 44a that receives the entire mounting element 42 including protrusions 42a. The anchor block opening 44b is defined by a cavity wall that encloses cavity 44a. The anchor block opening 44b is shaped as the periphery of the mounting element 42 including protrusions 42a. Once inserted completely into cavity 44a and rotated 90°, the mounting element 42 and clamp is locked in place. The anchor block is configured peripherally to fit in a vessel mounting track 40 as shown in FIG. 4B. The clamp 10 can be attached or removed from the mounting track 40 as desired. Accordingly, with reference to FIG. 4B, the mounting track 40 receives the anchor lock block 44 which anchor lock block 44 receives two keyed protrusions 42a of the clamp by rotation. FIGS. 4A and 4B also demonstrate the interaction between the various load/pull/push faces of the keyed protrusion and the anchor lock block 44. Anchor lock block has square base to fit in the mounting track in four different rotated orientations.

With reference to FIG. 5, a generic "C" shaped mounting track 40 is shown. A specific mounting track 40a may generally have a C-shaped cross-section. The modified mounting track 40a can be rigidly fixed to a marine vessel bulkhead (not shown) or other surface. The mounting track 40a interior passage is configured to receive the anchor lock block 44, which has corresponding peripheral geometry that permits movement of anchor lock block 44 in track 40a. The anchor lock block 44 therefore slides within the mounting track 40a for positioning as desired. The anchor lock block 44 receives the keyed protrusions 42 and 42a (FIG. 4A) of the clamp and therefore the clamp 10 slidingly engages the mounting track 40a for versatile and modular storage of a variety of items. FIG. 5 also depicts the clamp 10 in its closed position, with the strap 20 disposed around and closing the clamp opening, providing for resilient closure of one or more items within the clamp.

The strap 20 includes a fastener 20b with two holes for length adjustment to secure clamp 10 in a closed position to prevent an item secured in clamp 10 from accidental removal clamp 10 by exterior forces exceeding spring force on movable clamp arm 14. Strap locking post 20a is received through fastener 20b for holding the strap in place.

Figure 6:
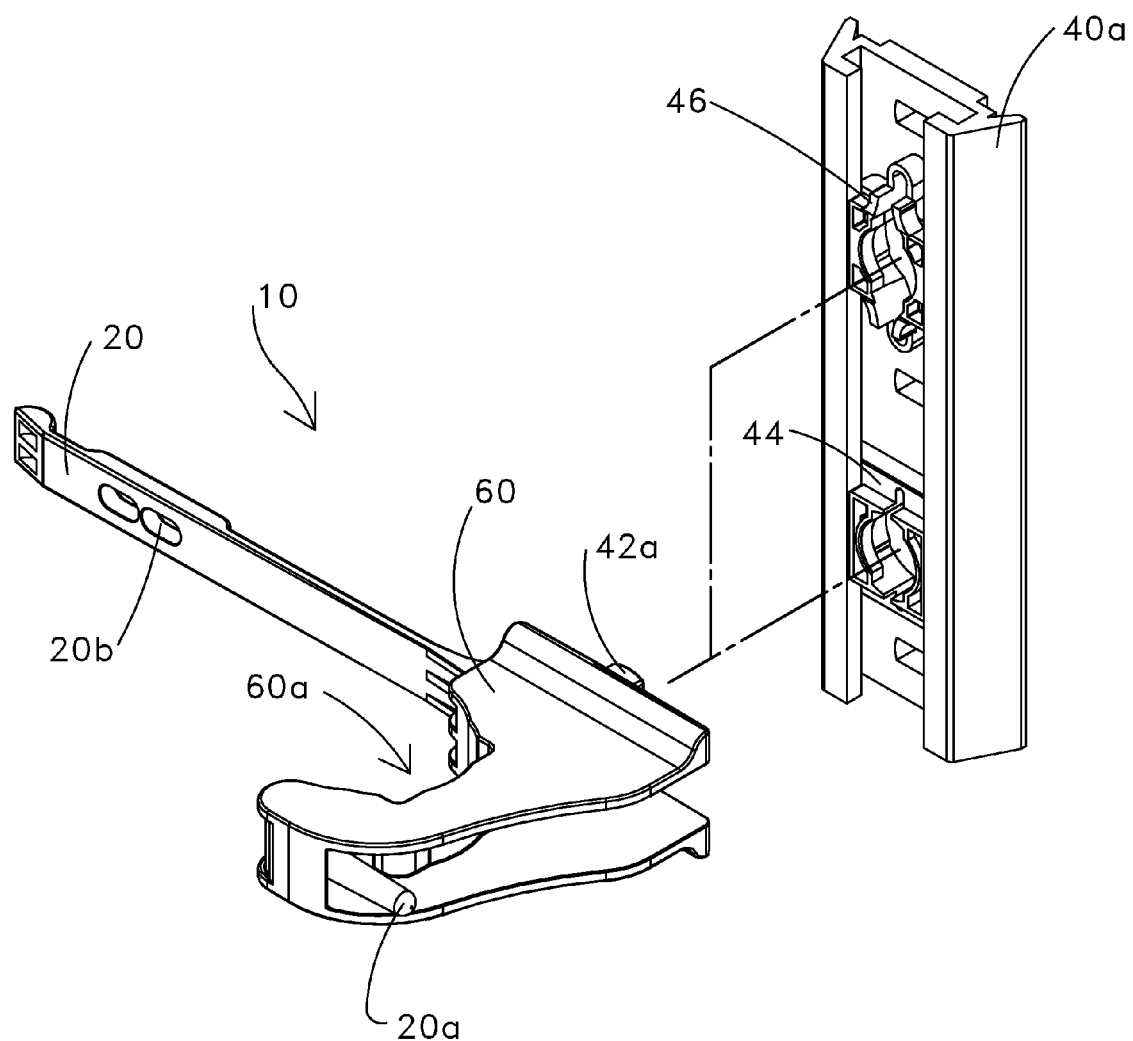
FIG. 6 is a front perspective view of another embodiment of the invention of a V-support holder along with two different anchor lock blocks.

FIGS. 6-13 depict another embodiment of the item holder 10 of the present invention. In FIG. 6 V-support holder 10 is shown comprising a rigid V-support arm 60 defining a V-shaped recess 60a. Attached to and extending from the holder arm 60 at one side of the recess 60a is a flexible strap 20. Strap 20 is used to secure items to the V-support holder 10, namely within recess 60a of holder arm 60. The strap 20 includes a fastener 20b defining, in some embodiments, two holes or apertures for adjustment to secure holder 10 in a closed position. In some embodiments, the fastener 20b is located substantially at the distal end of strap 20. Accordingly, holder arm 60 includes in some embodiments a strap locking post 20a extending therefrom.

The rear of holder arm 60 includes the keyed protrusions 42 and 42a, substantially as described above, defining a V-support holder block mounting element 42 and upper and lower protrusions 42a, therefore making the holder arm 60 compatible with the same anchor lock block 44 described throughout this specification. Accordingly, with mounting track 40a provided with anchor lock block 44, the V-support holder 10 can releasably engage the mounting track 40a for versatile and modular use of the present invention. Holder 10 can also releasably engage an alternate track mount, finger anchor block 46, which will be described in detail herein. Either anchor blocks 44 and 46 slide within track 40a that is secured to a vessel bulkhead.

Figure 7:
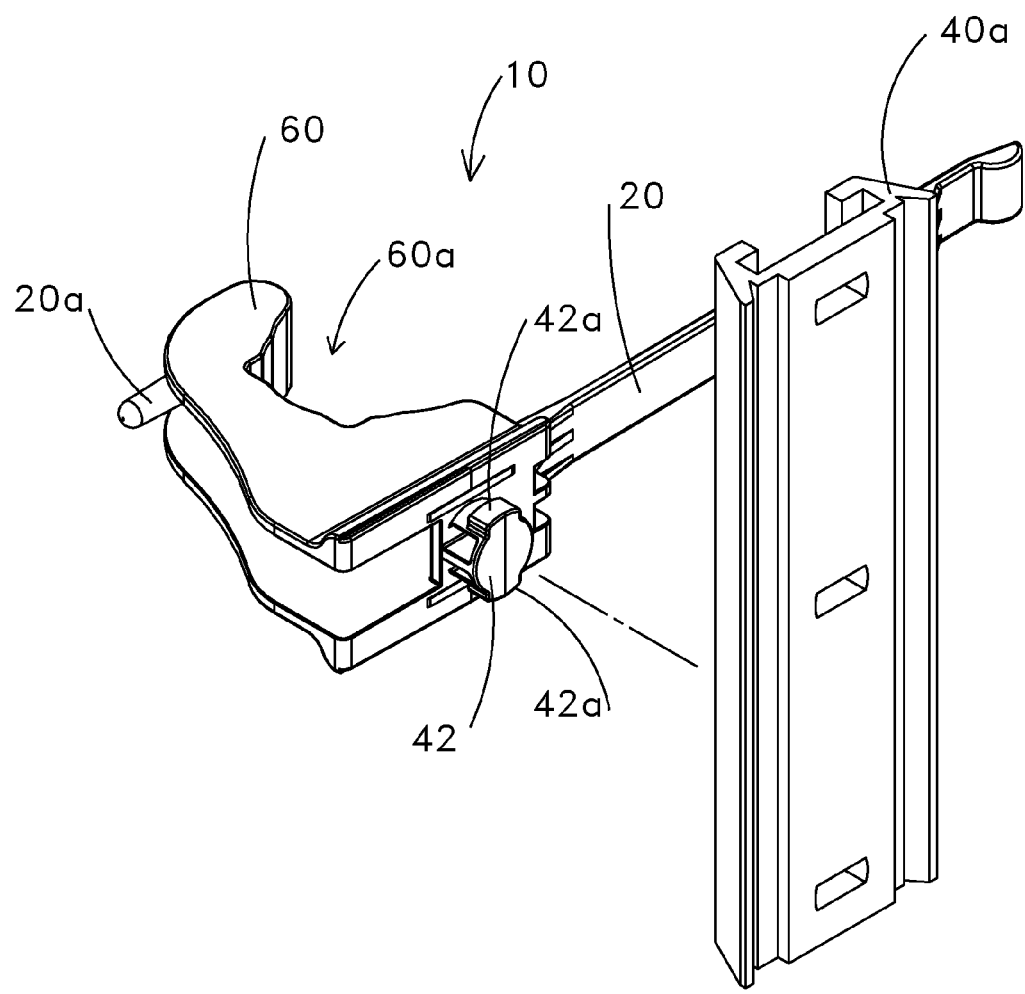
Figure 8:
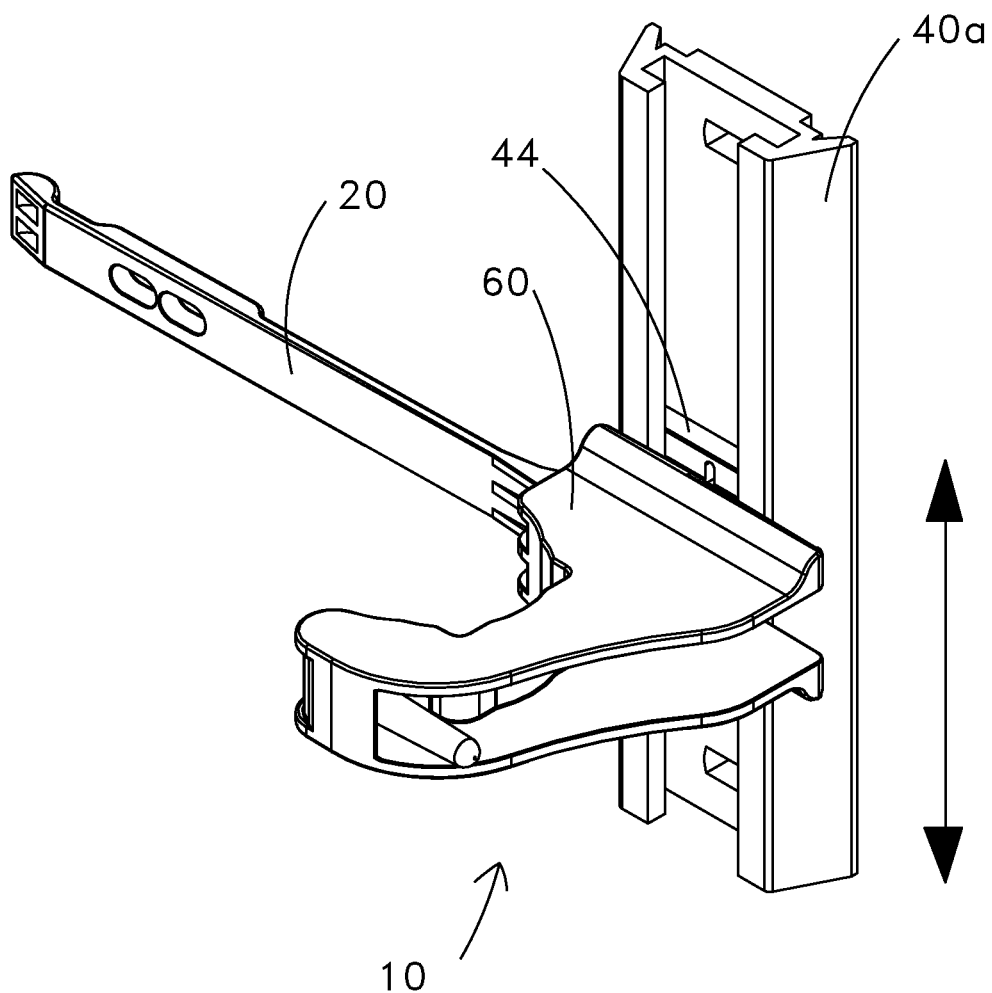
FIG. 8 is a front perspective view of the embodiment shown in FIG. 6 of the V-support holder positioned into an anchor block in a track before rotational engagement.
Figure 9:
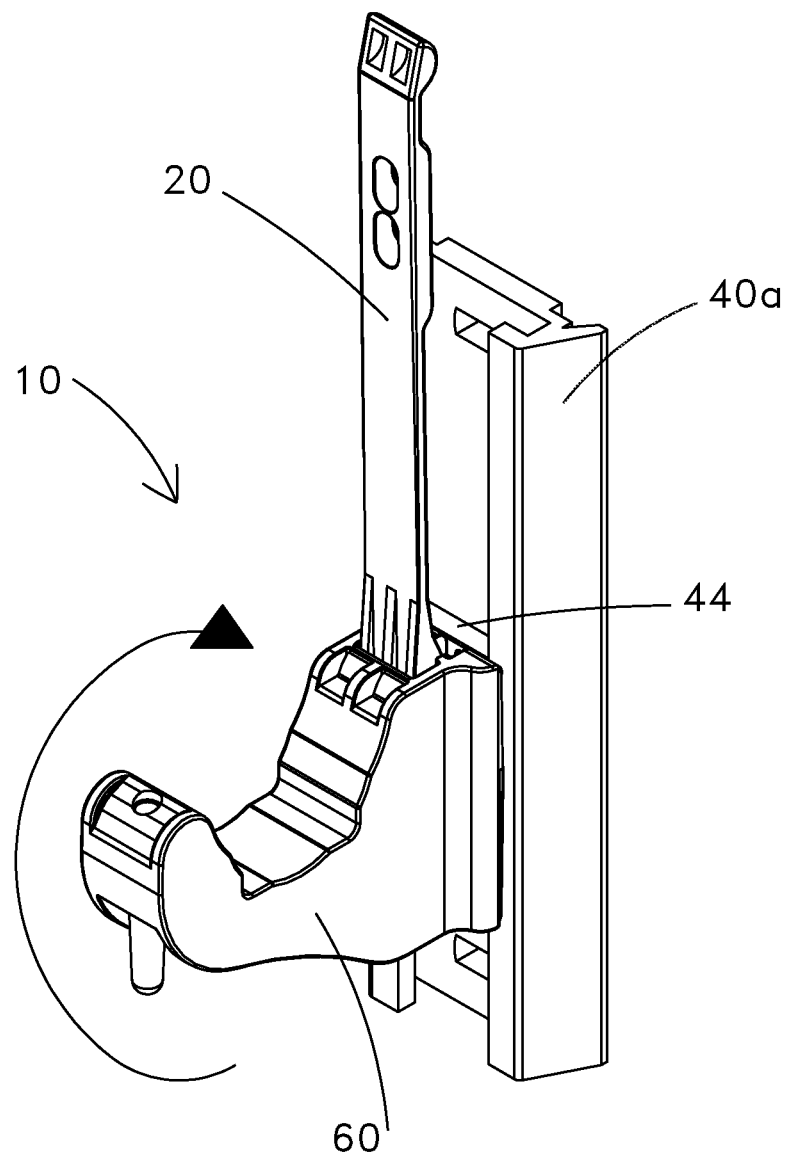
FIG. 9 is a front perspective view of the embodiment of FIG. 6 of the V-support holder of the present invention after being rotated into locking engagement with an anchor block and track.

FIG. 7 shows the holder 10 from FIG. 6 in a rear isometric view. Extending rearward from the holder arm 60 are keyed protrusions 42a, defining a V-support holder mounting element 42 and upper and lower protrusions 42a, which are configured to engage an anchor lock block 44 which provides load bearing faces to retain the mounting element 42. In some embodiments, the keyed protrusions 42a are configured to releasably engage the anchor lock block 44 to allow for quick connection and removal of the holder 10 mounting element from a mounting track 40a as desired usually with a twisting motion manually.

Figure 10:
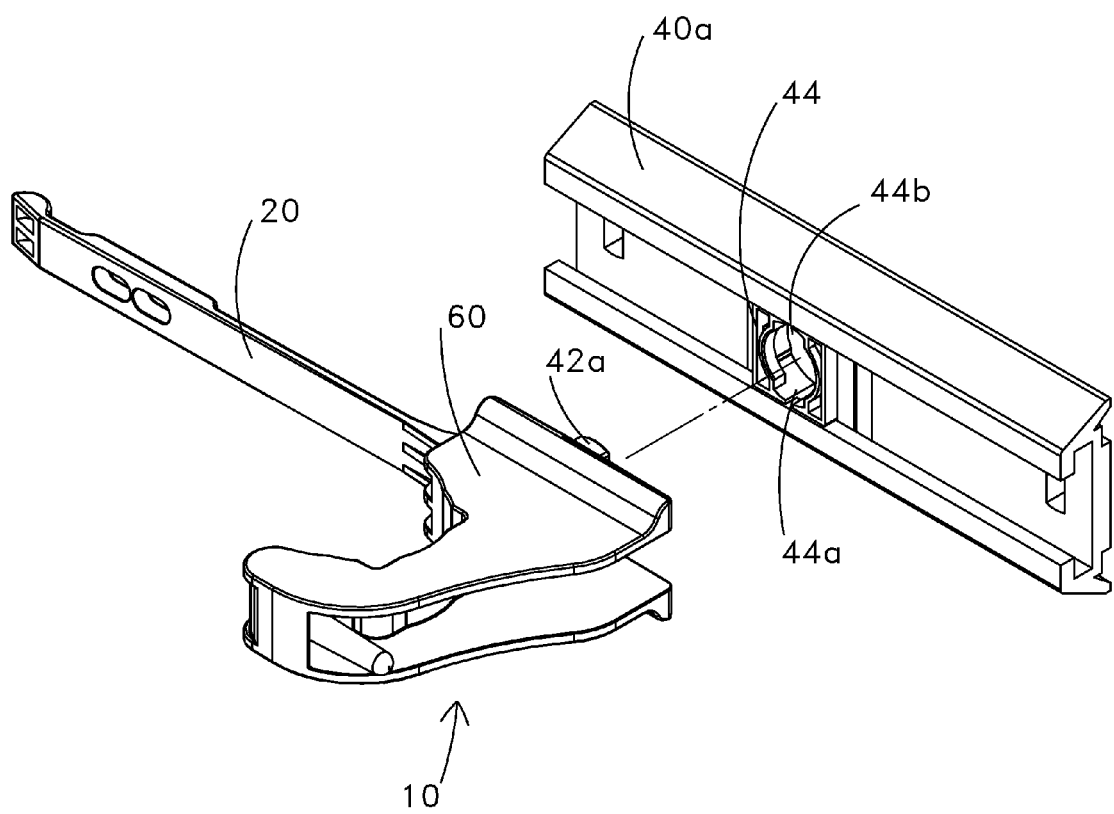
FIG. 10 is a front perspective view of the embodiment shown in FIG. 6 of the V-support holder exploded from an anchor block mounted in a track with the anchor lock block rotated 90° from the views shown in FIGS. 6-9.

The anchor block 44 has a female opening of a complimentary shape and an internal space for receiving the clamp mounting element 42 and upper and lower protrusions 42a. In order to attach the V-support holder 10 to the anchor block 44, the mounting element 42 and protrusions 42a are initially aligned with the female opening of anchor lock block 44. The mounting element 42 and protrusions 42a are manually inserted into the female opening in the anchor block 44 and rotated into a locked position shown in FIGS. 8 and 9, with the 90° rotation shown by the arrow in FIG. 9. The anchor block 44 is configured peripherally to fit in a vessel mounting track 40a as shown and the holder 10 can be attached or removed from the mounting track 40 as desired. In some embodiments, as shown by the arrows in FIG. 8, the anchor lock block 44 can slide and reciprocate within track 40a to allow for repositioning of the lock block 44 and therefore any holder 10 attached thereto. FIG. 10 shows the fitment of holder 10 into anchor lock block 44 with track 40a disposed horizontally. The anchor lock block 44 is oriented 90° rotationally in track 40a compared with the device in FIGS. 6-9. The clamp 10 can be oriented 90° based on the positions of the mounting track and anchor lock block 44. The clamp will function in any orientation of track 40a, utilizing the same rotating action to lock the mounting element 42 of clamp 10 into the anchor lock block 44.

Figure 11:
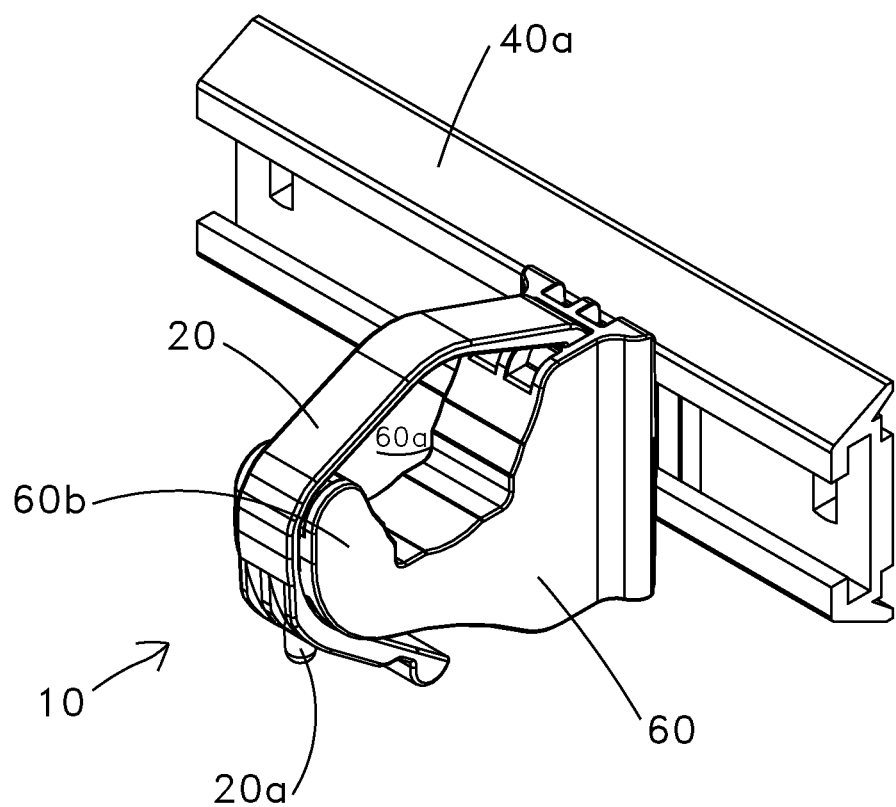
FIG. 11 is a front perspective view of the embodiment shown in FIG. 10 rotated 90° in a closed position and engaged with a track mount and a track.
Figure 12A:
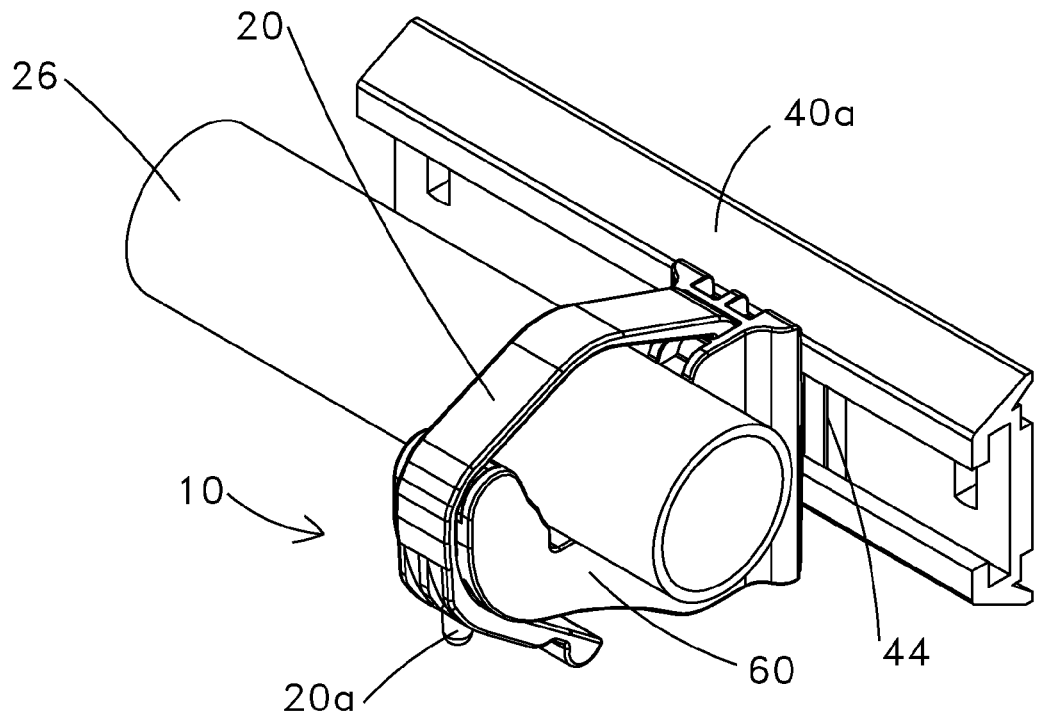
FIG. 12A is a front perspective view of the embodiment shown in FIG. 11 of the present invention engaged with an anchor block and a track and securing a cylindrical item horizontally.
Figure 12B:
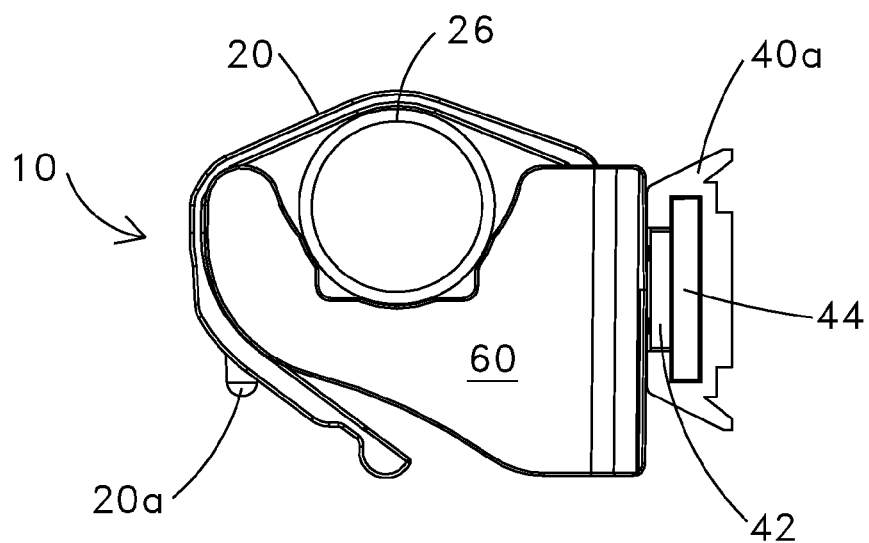
FIG. 12B is a side elevational view of the embodiment shown in FIG. 12A.

FIGS. 11-13 depict the V-support holder 10 with the strap 20 closed to secure an item within recess 60a. Strap 20 extends outwardly and around prong 60b of holder arm 60 with the fastener 20b received over strap locking post 20a. FIGS. 12A-12B show holder 10 securing an item 26, such as the shaft of a spear gun or other implement in a horizontal position. In some embodiments, strap 20 is flexible and resilient to allow the holder 10 to accommodate items of various sizes and shapes. Here, strap 20 is shown conforming around item 26 as the strap 20 wraps over cylindrical item 26. Ultimately strap 20 is secured over strap locking post 20a, providing a secure yet releasable fitment. FIG. 12B shows a cross-section of the holder 10 in use, also showing the arrangement of anchor lock block 44 inside track 40a, with mounting member 42 secured within anchor lock block 44.

Figure 13A:
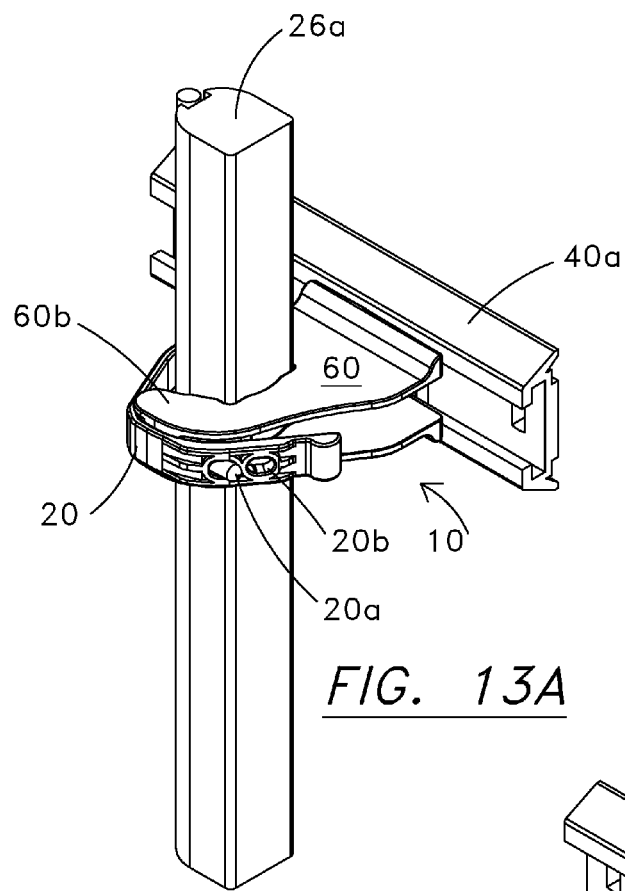
FIG. 13A is a perspective view of the V-support holder securing an item representing the body of a spear gun vertically with a horizontal mounting track.
Figure 13B:
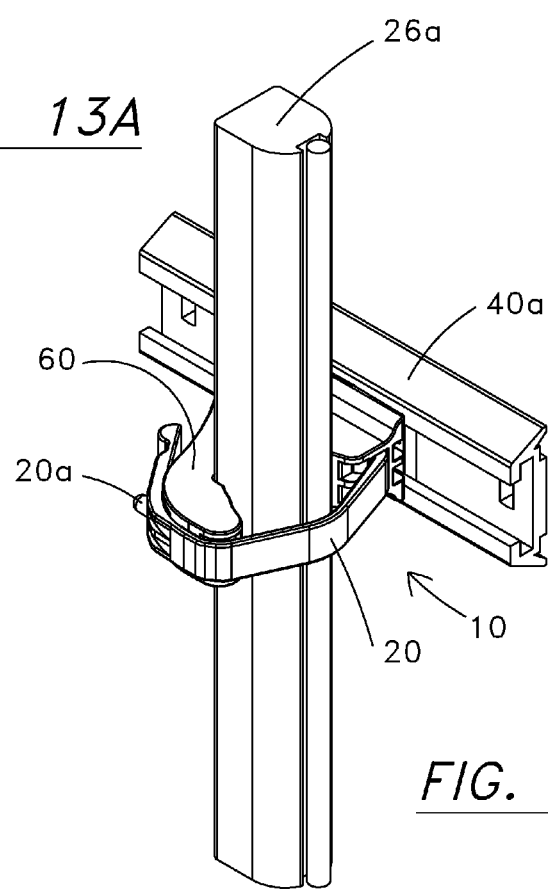
FIG. 13B is a perspective view of the device shown in FIG. 13A with the spear gun rotated 180°.

FIGS. 13A-13B depict the clamp 10 of the present invention configured to secure an item, such as spear gun 26a, in an upright or vertical position. As shown, the strap 20 is disposed over and around the spear gun 26a such that strap 20 conforms around spear gun 26a in order to secure the spear gun 26a inside recess 60a of the clamp arm 60. By selecting which of the fasteners 20b to utilize over locking post 20a, the V-support holder 10 can be configured to secure a variety of items of varying sizes and shapes. Accordingly, it is appreciated that the length and width of strap 20 is configured to be adjustable to suit a variety of applications.

Figure 14A:
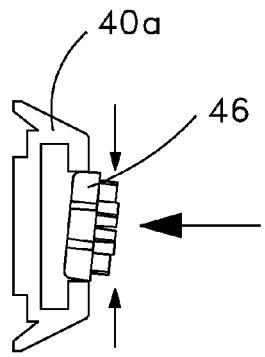
FIG. 14A is a side elevational view of another embodiment of an partially inserted anchor block and track mount of the present invention, configured as a flexible finger anchor block.
Figure 14B:
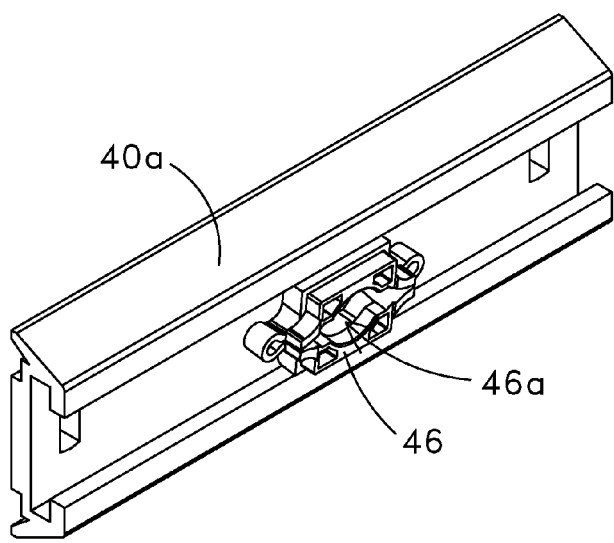
FIG. 14 B is a front perspective view of the flexible finger block shown in FIG. 14A.
FIG. 14C is a side elevational view of the flexible finger anchor block mounted within a track.
Figure 14C:
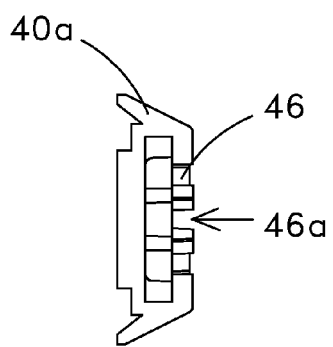
Figure 14D:
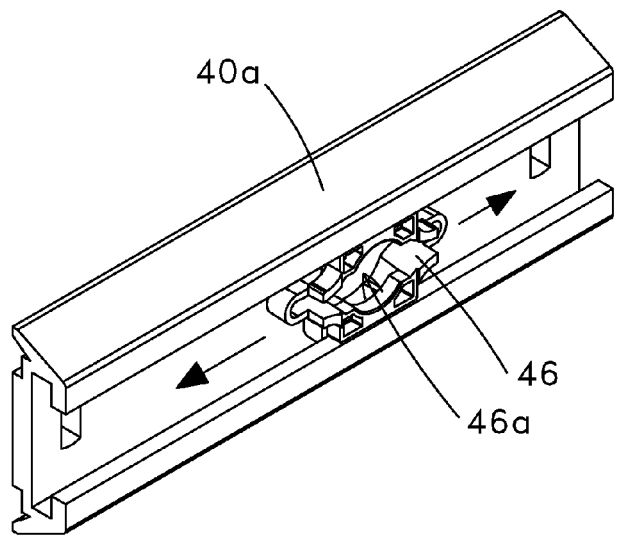
Figure 15A:
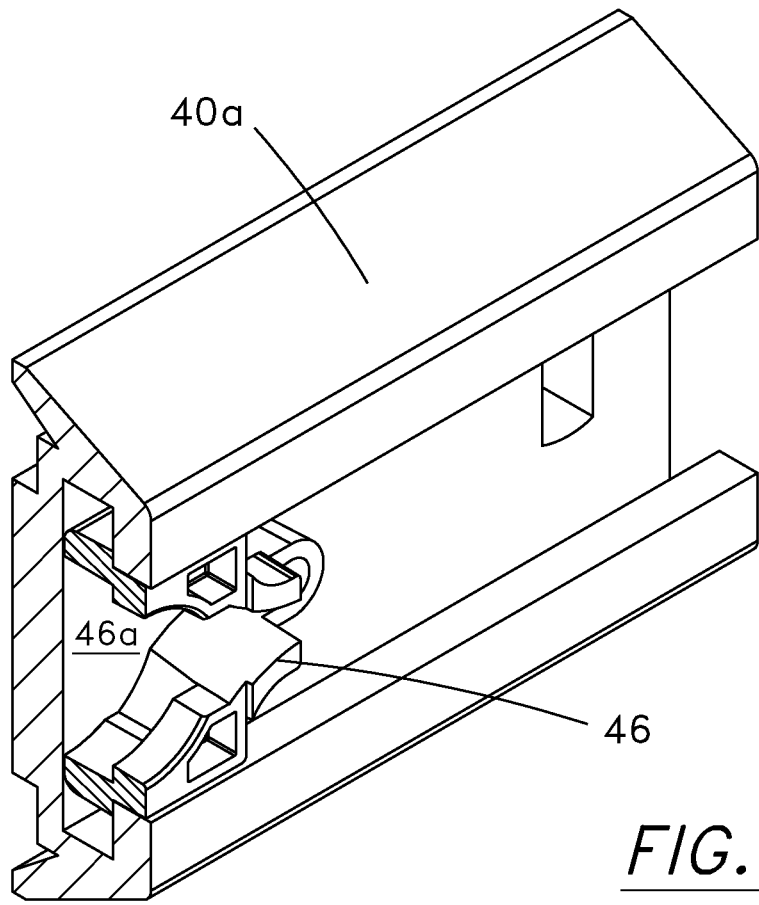
FIG. 15A is a front elevational view partially in cross sectional of the flexible finger anchor block shown in FIGS. 14A through 14D.
Figure 15B:
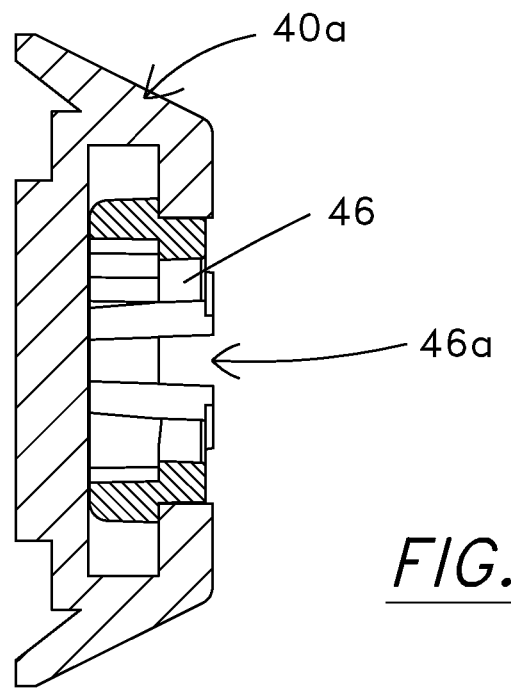
FIG. 15B is a side elevational view in cross section of the device shown in FIG. 15A.

An additional feature of the present invention is an alternative design for a mounting block, defined as finger anchor block 46 shown in FIGS. 6, 14-15. Finger anchor block 46 is a flexible mounting block that can be manually inserted anywhere in track 40 or 40a while other anchor lock blocks 44 or finger anchor blocks 46 are present. Because of its flexible configuration, finger anchor block 46 can be inserted into the track 40 or 40a without having to access to the ends of the track, which is otherwise required in the case of anchor lock block 44, due to its rigid construction. Thus, the finger anchor block 46 permits the user to add one or more extra track mounts for various supports for items between existing mounting items and also allows the user to add and remove the finger anchor blocks 46 on demand at any time regardless of whether other track mounts are being used. As shown in FIGS. 14-15, finger anchor block 46 is flexible and is constructed to be inserted manually directly into track 40a. Finger anchor block 46 includes a receiving cavity 46a that is configured to receive the mounting protrusions 42 and 42a of the clamps 10 described above. In some embodiments, the finger anchor block 46 is comprised of a flexible but resilient material such that the user can squeeze the top and bottom of the finger anchor block 46 manually such that the block 46 walls compress sufficiently to fit inside track 40a. It is appreciated that the user can squeeze and deform the anchor block 46 manually with the fingers, avoiding the need for hardware or tools to fit the block 46 into the track 40a.

Once inserted, the finger anchor block 46 will return to its original dimensions and provide a snug fit inside the track 40a. At this point, a V-support holder 10 can be inserted into the finger anchor block 46 substantially as described above. It is appreciated that the receiving cavity 46a is configured to function with the protrusions 42 and 42a of the holder 10, whereby the holder 10 is inserted into the finger anchor block 46 and rotated, securing the holder 10 therein. It is further appreciated that the finger anchor block 46 can slide within the track 40a as shown in FIG. 14D, much like the anchor lock block 44 described above, in order to allow for repositioning of the finger anchor block 46 and attached V-support holders 10 as desired.

It is appreciated that the present invention and its constituent parts can comprise any desired materials or combination of materials such as metals, plastics, resins, and combinations thereof. Because the present invention is particularly useful on marine vessels, it would be desirable to select materials that are relatively corrosion resistant and which are prone to surface reaction or interaction in the presence of a corrosive environment. It is further appreciated that the mounting track of the present invention is configured to receive a plurality of storage accessories in addition to the V-support holder of the present invention such that the item holder can be used adjacent to other item holders or retainers of varying sizes. Thus, in one example, a spear gun may be resiliently retained adjacent to a scuba tank with the spear gun being more easily retained in the properly sized holder 10 of the present invention, instead of the much too large scuba tank holder. Further still, the sliding action of the clamp within the mounting track, by way of the anchor lock block, renders the present invention particularly useful, modular, and versatile.

The instant invention has been shown and described herein in what is considered to be the most practical and preferred embodiments. It is recognized, however, that departures may be made therefrom within the scope of the invention and that obvious modifications will occur to a person skilled in the art.

What is claimed is:

1. A spear gun clamp for tightly securing a spear gun to a track either vertically or horizontally comprising:
   a rigid arm having a free end portion and having a flat end surface, said arm having a lower extended surface and an upper extended surface with a central recess configured to receive said spear gun;
   a strap connected to the flat end surface of said arm at one end of the strap, said strap having an arm fastener near its free end;
   a strap fastener post mounted on said free end portion of said arm for fastening said strap free end to said strap fastener on said arm, said strap sufficient in length to secure said spear gun mounted in and about said arm central recess;
   said arm having key protrusions extending from the arm flat end surface for connecting said arm to an anchor block mounted in a track; and
   said anchor block having a female block opening shaped to receive said keyed protrusions extending from said arm flat end in one direction and shaped internally to retain said keyed protrusions in a 90° rotated position to allow said arm to be rotatably locked to said anchor block vertically or horizontally relative to said arm central recess to secure a vertically mounted or horizontally mounted spear gun to a vessel bulkhead.

2. A device as in claim 1, wherein:
   said rigid arm flat end including protrusions of a predetermined shape to engage said anchor block female opening for attaching said arm to said anchor block.

3. A device as in claim 1 that can tightly secure any elongated object having a diameter that fits into the arm central recess and strap when fastened.

* * * * *